Figure 3:
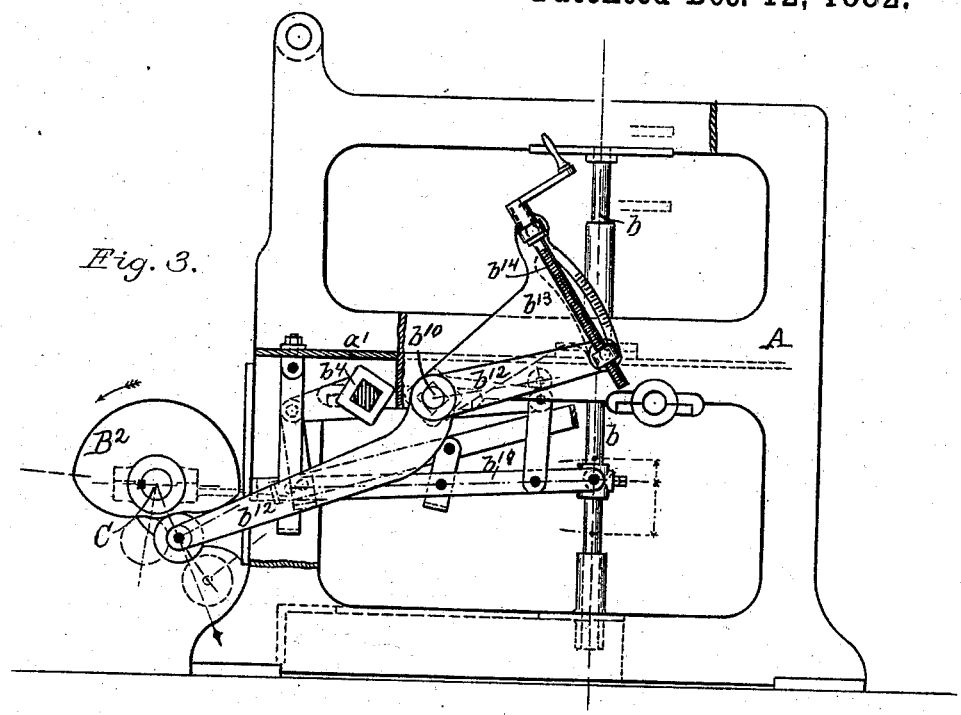

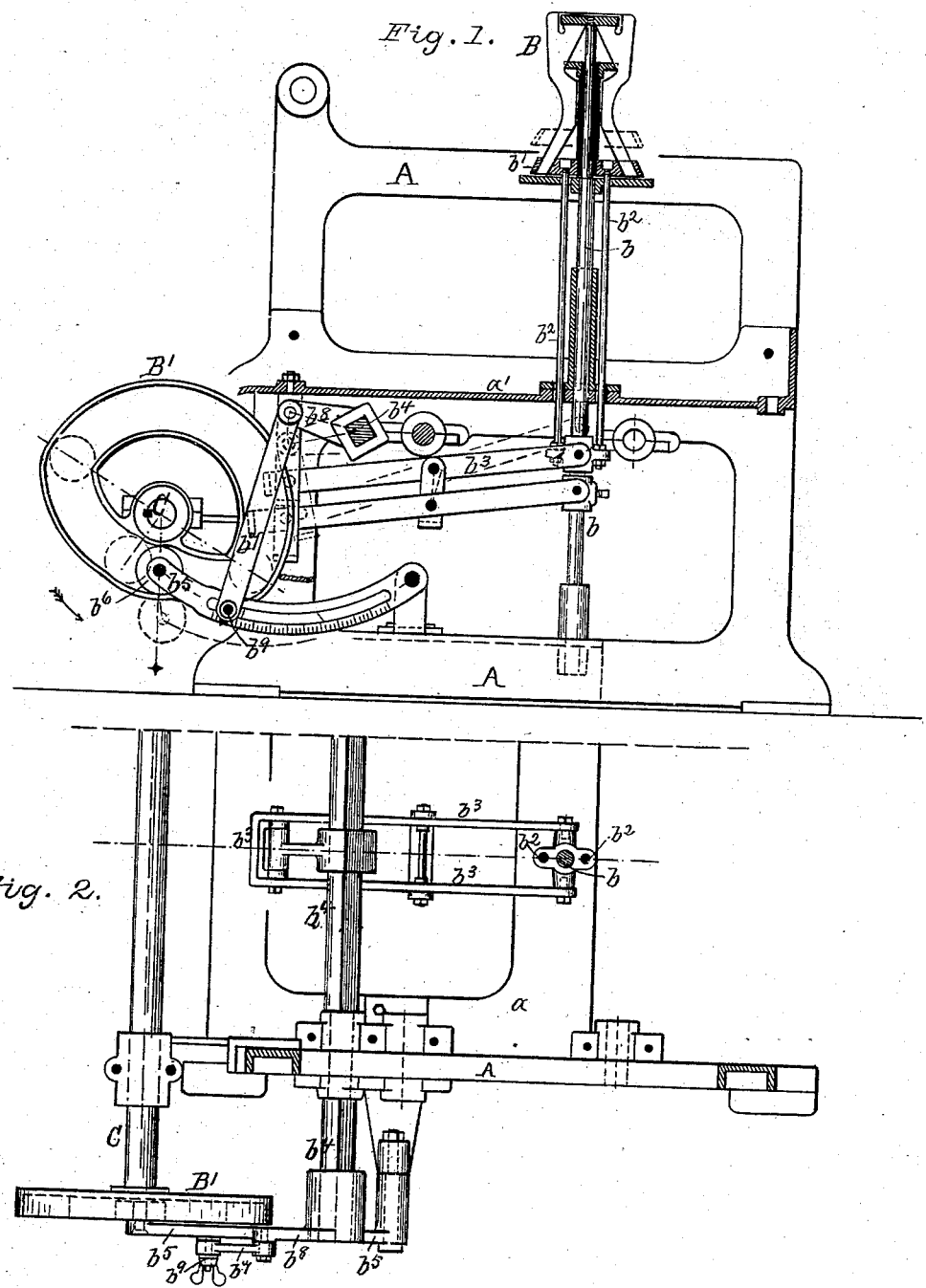

(No Model.) 7 Sheets—Sheet 2.

R. EICKEMEYER.
MACHINE FOR BLOCKING AND SHAPING HATS.

No. 269,032. Patented Dec. 12, 1882.

Attest:
Philip F. Larner
Howell Bartle

Inventor:
Rudolf Eickemeyer
By Wm C Wood
Attorney.

N. PETERS, Photo-Lithographer, Washington, D. C.

(No Model.)
7 Sheets—Sheet 3.

R. EICKEMEYER.
MACHINE FOR BLOCKING AND SHAPING HATS.

No. 269,032.
Patented Dec. 12, 1882.

Attest:
Philip F. Larner
Nowell T. Bartle

Inventor:
Rudolf Eickemeyer
By Wm. C. Wood
Attorney.

(No Model.)

R. EICKEMEYER.
MACHINE FOR BLOCKING AND SHAPING HATS.

No. 269,032.　　　　Patented Dec. 12, 1882.

Attest:
Philip F. Larner
Howell Bartte

Inventor:
Rudolf Eickemeyer
By Wm C Wood
Attorney.

(No Model.) 7 Sheets—Sheet 5.
R. EICKEMEYER.
MACHINE FOR BLOCKING AND SHAPING HATS.
No. 269,032. Patented Dec. 12, 1882.
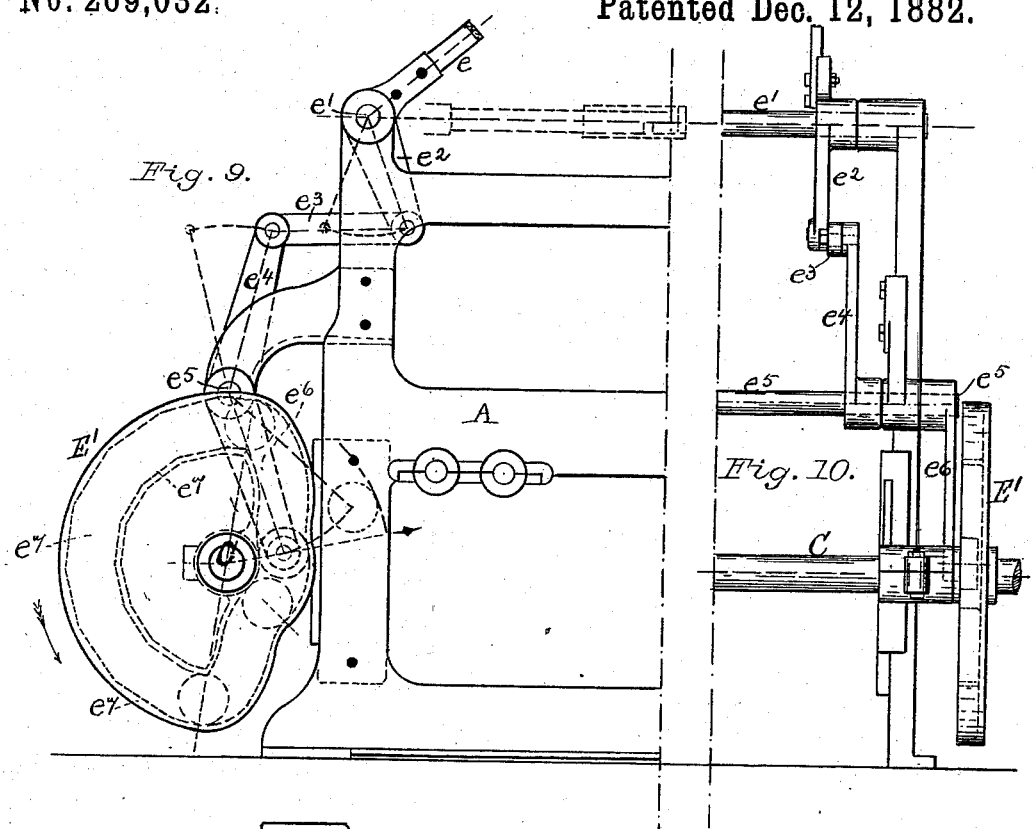
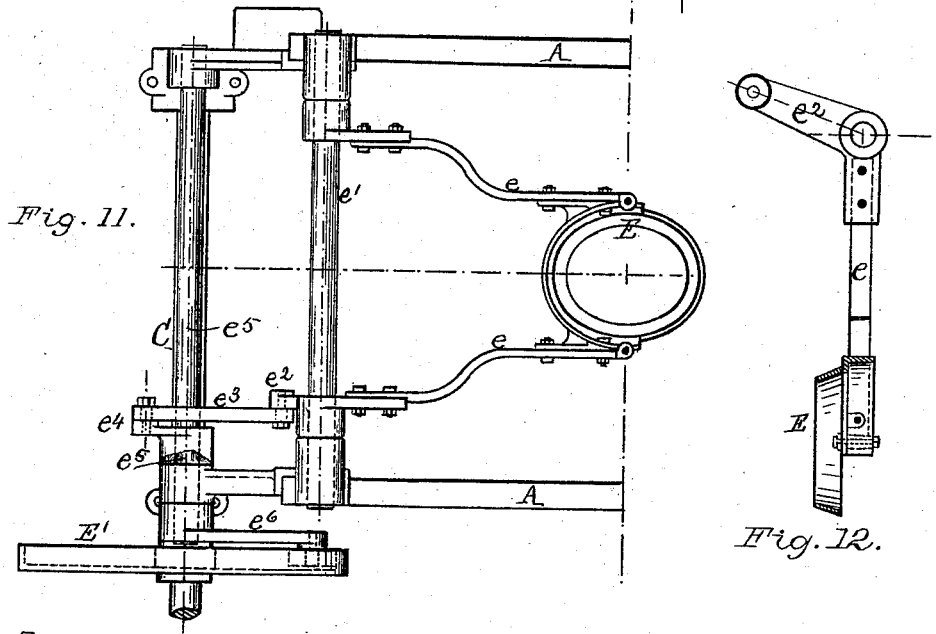

(No Model.) 7 Sheets—Sheet 6.
R. EICKEMEYER.
MACHINE FOR BLOCKING AND SHAPING HATS.
No. 269,032. Patented Dec. 12, 1882.
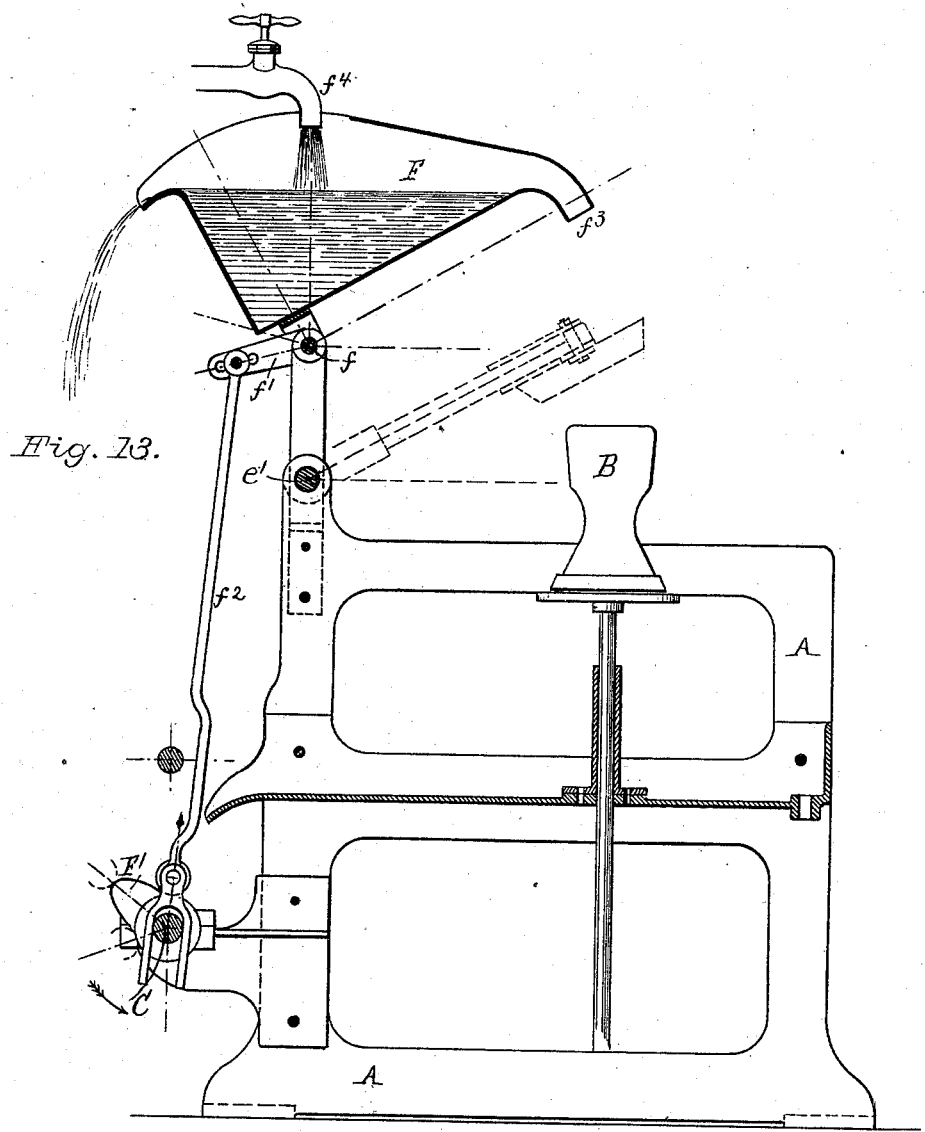
Attest:
Philip F. Larner.
Howell Carter
Inventor:
Rudolf Eickemeyer
By Wm E Mod
Attorney

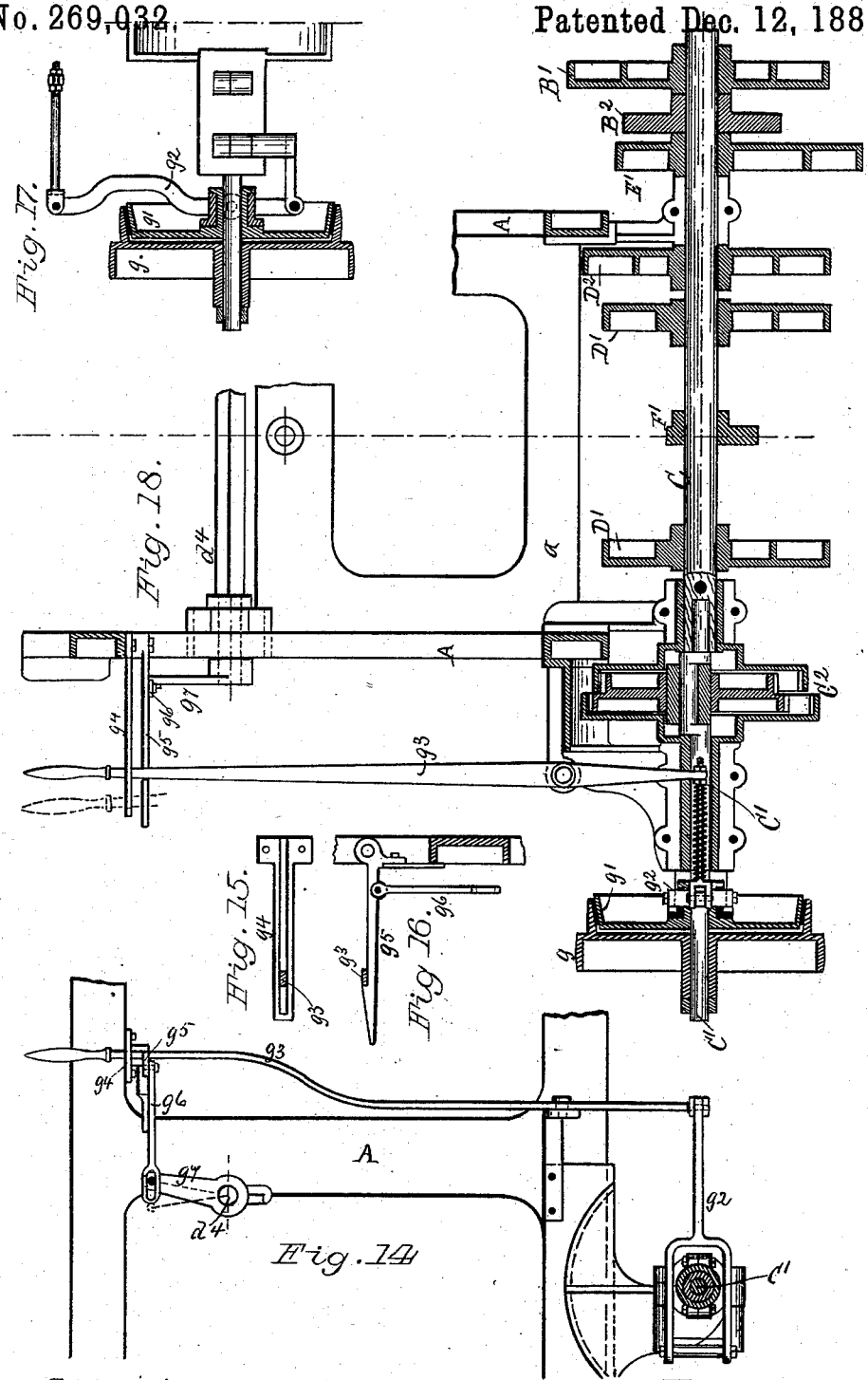

UNITED STATES PATENT OFFICE.

RUDOLF EICKEMEYER, OF YONKERS, NEW YORK.

MACHINE FOR BLOCKING AND SHAPING HATS.

SPECIFICATION forming part of Letters Patent No. 269,032, dated December 12, 1882.

Application filed September 23, 1882. (No model.)

*To all whom it may concern:*

Be it known that I, RUDOLF EICKEMEYER, of Yonkers, in the county of Westchester and State of New York, have invented certain new and useful Improvements in Machines for Blocking and Shaping Hats; and I do hereby declare that the following specification, taken in connection with the drawings furnished and forming a part thereof, is a clear, true, and complete description of the several features of my invention.

The object of my present improvements is to automatically perform the operation of blocking and shaping hats, thereby not only placing the proper attendance of a machine within the scope of persons of ordinary skill, but enabling a workman of greater skill to either attend a number of such machines, or to attend, without loss of time, one of such machines in connection with the attendance of certain other automatic machines heretofore devised and patented to me for performing certain stretching operations, which are necessarily preliminary to blocking and shaping. Although for obtaining the most economic results all of my present improvements should be employed in one organization, it will be obvious that any portion thereof may be profitably used, even if certain other portions of the machine be operated by hand, as heretofore. In my present machine, having in view the best results, I have necessarily embodied many inventions heretofore patented to me. So far as relates to the actual work performed by those portions of this machine which operate directly upon or in contact with a hat-body for blocking and shaping, my present machine involves no novelty, and the mechanism now employed for operating said parts is, when broadly considered, substantially as heretofore employed by me, saving and excepting such devices as are now introduced for rendering certain operations automatic which were before performed by hand, and, also, such novel organization of intermediate mechanism as has been deemed requisite in a machine which is wholly automatic in its operation. I have also, in my present machine, introduced as a novel feature an automatic douche, whereby, when the hat-blocking is completed, the hat is thoroughly bathed with cold water for setting it in the form developed by the blocking operation; or said douche may be also employed for delivering hot water to the hat during the blocking operation.

Various forms of hat-blocks and varieties of brim-clamping mechanism may be employed in accordance with certain features of my present invention, as they would each only require such obvious variations in the operative mechanism as would be necessarily involved therewith in each case. The hat-block now used by me is of the expansible variety, and is accompanied with a reciprocating banding-ring and expansible brim-clamping tongs, as heretofore patented to me, as will hereinafter be fully set forth.

After fully describing a machine embodying all of my present improvements as preferably organized by me, I will specify, in the several claims hereunto annexed, the features deemed novel and constituting separate features of my invention.

In the drawings I have, with a view to their more convenient reading, presented separately most of the organizations of mechanism which cause the proper movements of those parts which operate directly upon or in contact with the hat, and in said drawings, of which there are seven sheets—

Figure 4:
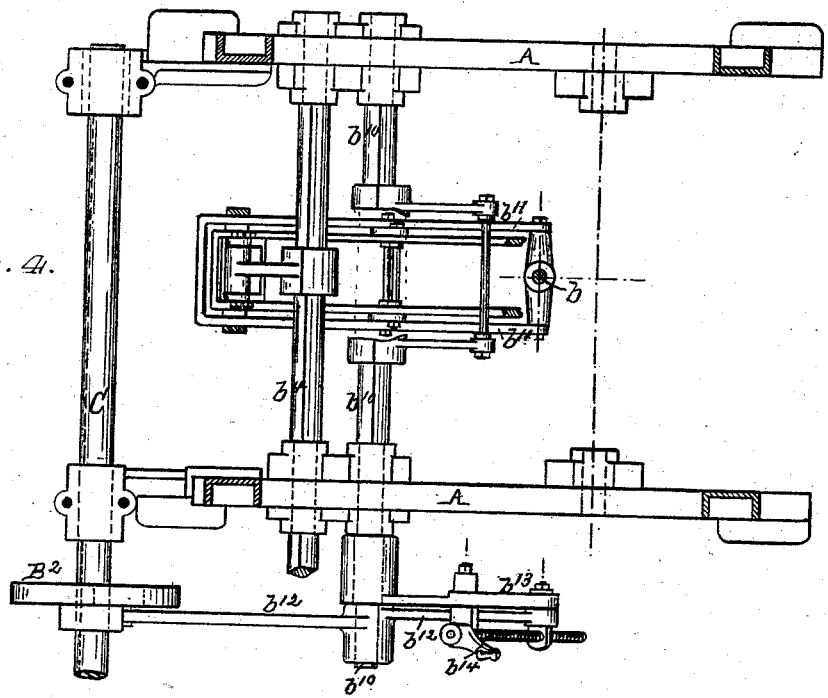
Figure 5:
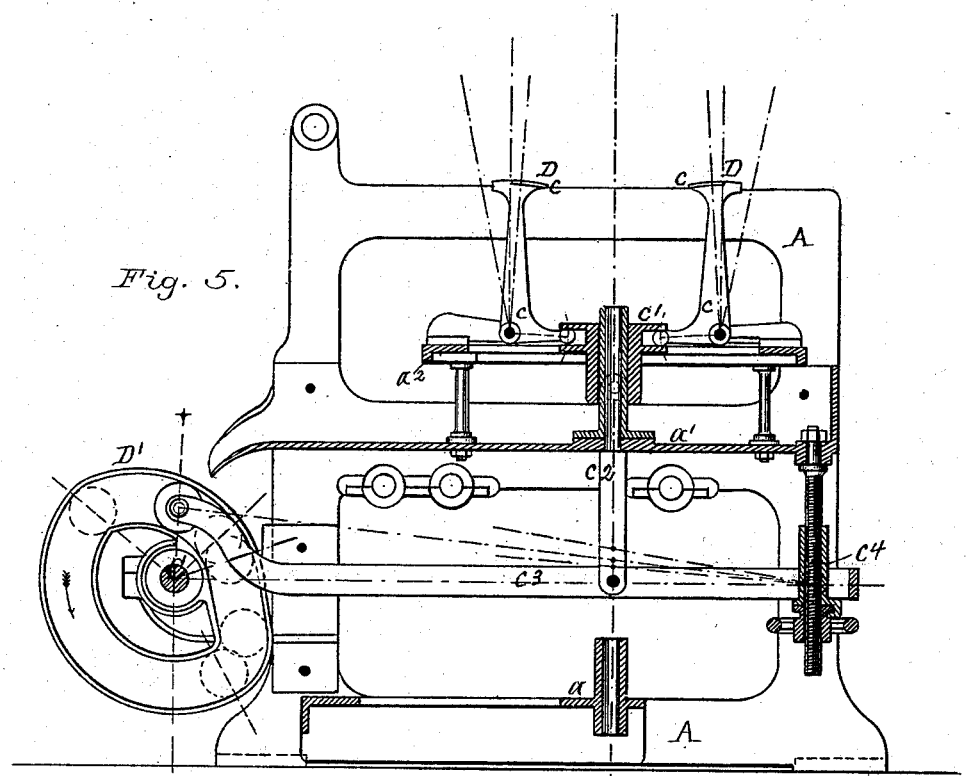
Figure 6:
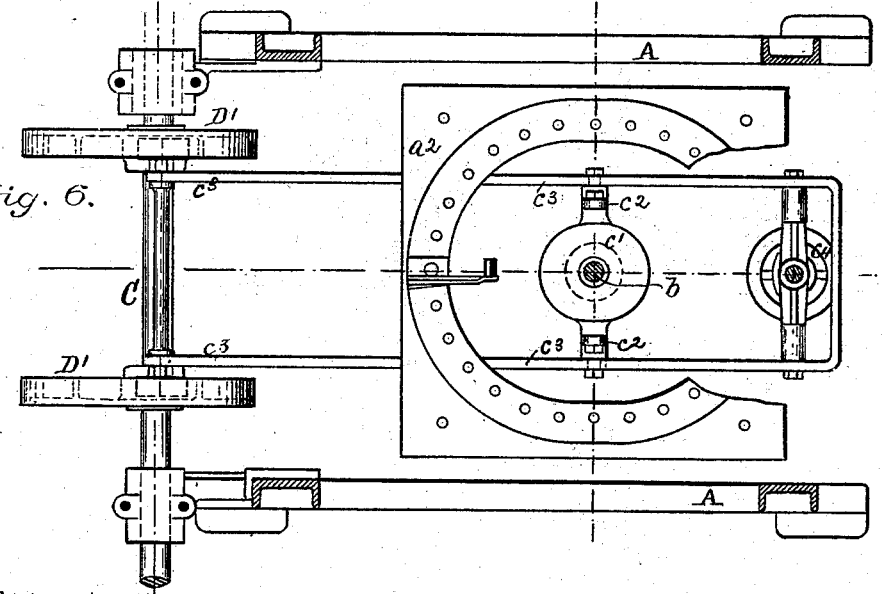
Figure 7:
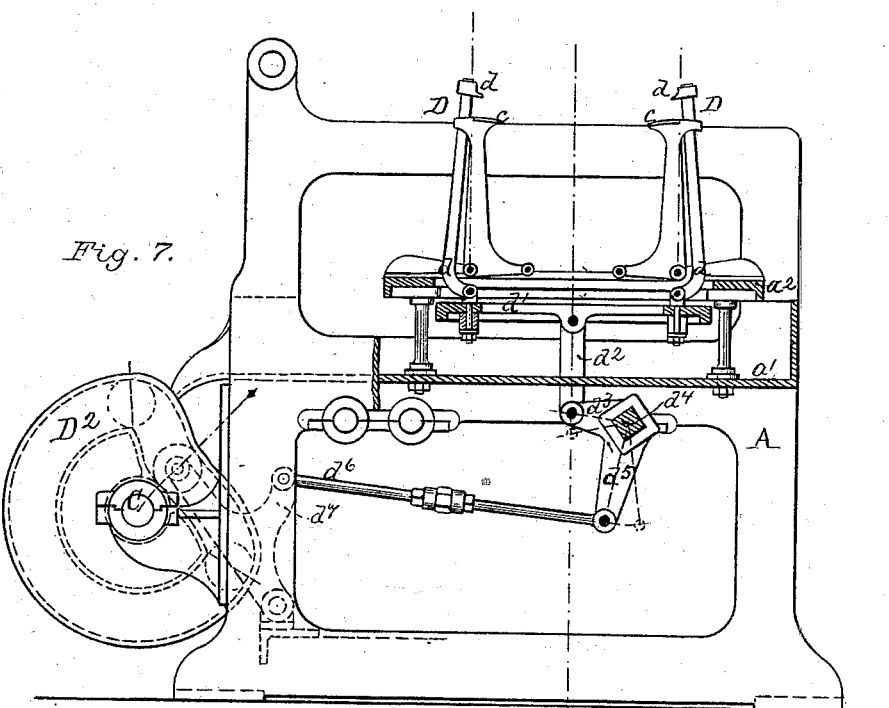
Figure 8:
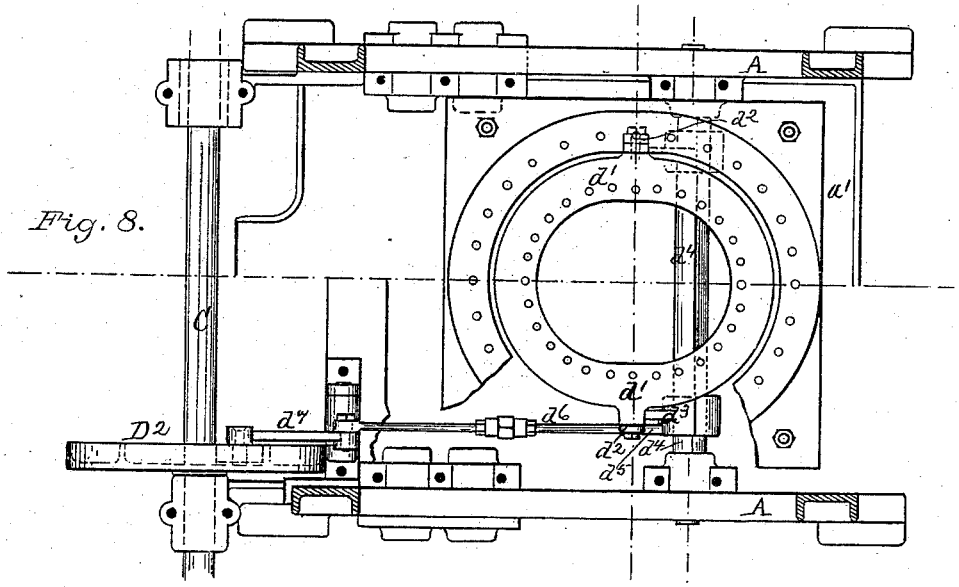

Figures 1 and 2, Sheet 1, are respectively a vertical section and a top view of so much of the machine as pertains to automatically expanding the hat-block, and to adjusting mechanism for adapting said block to operate on hats of various sizes. Figs. 3 and 4, Sheet 2, are respectively a vertical section and a top view of so much of the machine as pertains to lowering and raising the block, and adjusting mechanism for adapting said block to various heights of crown. Figs. 5 and 6, Sheet 3, are respectively a vertical section and a top view of so much of the machine as pertains to the lower or base portion of the brim-clamping tongs, their expanding mechanism, and means for adjusting their range of expansion. Figs. 7 and 8, Sheet 4, are respectively a vertical section and a top view of so much of the machine as pertains to the upper or clamping portion of the brim-clamping tongs and their operating mechanism. Figs. 9, 10, and 11, Sheet 5, are respectively a side view, a rear view, and a top view of so much of the machine as pertains to the banding-ring and its operating mechanism. Fig. 12, Sheet 5, is a detached side view of the banding-ring and the lever on which it is mounted. Fig. 13, Sheet 6, is a vertical section of so much of the machine as pertains to the douche and its operating mechanism. Figs. 14 to 17, Sheet 7, are various views of so much of the machine and detached parts thereof as are deemed requisite for illustrating the stop-motion for stopping, and the method of starting the machine. Fig. 18, Sheet 7, is a horizontal section of a portion of the machine on a line with the main driving-shaft for illustrating the various cams employed for imparting the requisite motions to the hat-working devices, and discharging the douche, and also further illustrating the starting and stopping mechanism.

The frame of the machine is composed of duplicate side plates, A, and lateral plates $a$ and $a'$, and on top of the latter another plate, $a^2$, is supported on standards, as seen in Figs. 5 to 8, inclusive, Sheets 4 and 5, and the present frame differs from the prior frames used by me and shown in certain of my prior Letters Patent only in such particulars as are naturally involved in the application of automatic mechanism and my novel douche.

Referring now to Sheet 1, Figs. 1 and 2, it is to be understood that the expansible hat-block B is in all essentials the same as that shown and described in my Letters Patent of July 29, 1873, No. 141,338; also, that it is mounted upon its spindle $b$, is expanded by a cone-plate, $b'$, mounted upon rods $b^2$, reciprocated by levers $b^3$ through a rock-shaft, $b^4$, connected thereto by a rearwardly-projecting arm, substantially as in my prior Letters Patent No. 167,083, August 24, 1875, with certain improvements thereon, as in my prior Letters Patent, No. 244,041, July 12, 1881. As heretofore organized by me, however, the expansion of said block during the blocking operation was performed by the attendant working a hand-lever which was connected to the rock-shaft. I now provide, as a novel feature, a side-grooved cam, B', on a revolving shaft, C, which vertically vibrates one end of a curved cam-lever, $b^5$, having a roller, $b^6$, in the cam groove, and to said lever a link, $b^7$, is pivoted for connection with an arm, $b^8$, on the rock-shaft $b^4$. It is obvious that by the rotation of the cam, shaped substantially as shown, the block will be expanded and maintained in that condition during one-half of each revolution of the shaft C, and thereafter restored to its normal contracted condition. To provide for variations in sizes of hats, and a consequent variation in the degree of expansion by the block, I formerly employed an adjusting-screw and a segmental plate or lever as a connecting medium between the hand-lever and the rock-shaft for varying the extent of its rocking movement; but I now attain the same end by the novel combination, with the rock-shaft, of the curved cam-lever $b^6$, having a curved slot and an adjacent graduated scale on its side, as clearly shown in Fig. 1, and the link $b^7$, which is adjustably pivoted to said curved lever, its pivot $b^9$ being provided with a clamp-nut for securing it at any desired position. It is obvious that in proportion as the pivot of the link $b^7$ is moved and located away from the cam the less will the block be expanded, and also that the scale, being properly graduated, enables the adjustment to be readily made, so as to accurately block any size of hat-crown.

Referring next to Figs. 3 and 4, Sheet 2, it is to be understood that the requisite lifting and lowering motions of the hat-block are as provided for in my said prior Letters Patent, No. 167,083, and also that said movements are as described in my Letters Patent No. 244,041, wholly independent of the movements of the expanding mechanism; but as heretofore organized by me said lifting and lowering movements were obtained by means of a hand-lever operated by the attendant, said hand-lever being connected to the rock-shaft $b^{10}$, which is in this machine connected by crank-arms, links, levers $b^{11}$, and cross-head to the block-spindle $b$, substantially as heretofore, and as clearly indicated in said Figs. 3 and 4. As a novel feature I have now provided a cam, B², on the rotating shaft C, the edge of which, by contact with a roller on the cam-lever $b^{12}$, causes the latter to vibrate and (when coupled, as next described) to impart the requisite rocking movement to the rock-shaft for gradually lifting the block to the extent of about one inch and maintaining it in its elevated position during one-half of each revolution of said cam-shaft, and then to lower it. For limiting the lifting movement of the block-spindle for blocking crowns of different heights I employ, in connection with the cam-lever and rock-shaft for coupling them together, a segmental-shaped lever, $b^{13}$, and the adjusting-screw $b^{14}$, whereby the rotative position of the rock-shaft may be varied with respect of the cam-lever, substantially as shown in my Letters Patent No. 167,083, in connection with the hand-lever then used by me.

It is not broadly new to raise and lower a hat-block automatically, as is instanced in Letters Patent No. 53,661, issued to George Osterheld and myself April 3, 1866, and also in my own Letters Patent No. 72,726, December 31, 1867; but I now for the first time have devised and disclosed automatic mechanism for raising and lowering an expansible hat-block, which is provided with means for independently contracting and expanding it. The series of brim-clamping tongs D, Fig. 7, are annularly arranged, and each pair of tongs is composed of a lower or bed jaw, $c$, and an upper or clamping jaw, $d$, for seizing a brim near its edge and pulling outwardly thereon, and they have precisely the same movements as are described in my aforesaid Letters Patent No. 167,083, and may or may not be provided with the improvements thereon, which are described in my Letters Patent No. 244,041.

Referring now to Sheet 3, Figs. 5 and 6, it is to be understood that the lower jaws, $c$, are pivoted upon brackets projecting from a frame-plate, $a^2$, elevated on standards from and supported by the middle plate, $a'$, of the frame, and also that said jaws are at their lower ends engaged by a central annularly-grooved hub or controlling-ring, $c'$, loosely surrounding the block-spindle, and provided with lowering and lifting links $c^2$, as shown in my said Letters Patent No. 167,083; but in said prior machine said links $c^2$ were connected by other links and a lever with a treadle-lever in such a manner that when the attendant pressed his foot upon the treadle, the controlling-ring was lifted and all the jaws $c$ were thereby simultaneously moved outwardly. In my present machine the links $c^2$ are pivoted to a pair of horizontal levers, $c^3$, at the rear ends of which are rollers respectively occupying side grooves in the counterpart-cams $D'$ on the revolving shaft $C$, and the form of said cams and their adjustment on said shaft are such as to impart the proper movements in proper time for causing the expansive movements of the tongs and maintaining them thus expanded for about two-fifths of the revolution of said cams and thereafter returning them to their original position. In my former machine I provided for adjustable variation in the range of the expansive movement of said tongs by means of a movable fulcrum and an adjusting-screw for the lever $c^3$, to which the links $c^2$ were connected, and, as is clearly shown, I now employ the same feature at $c^4$ in connection with the cam-lever and its cam.

Referring next to Sheet 4, Figs. 7 and 8, it is to be understood that the upper or clamping jaws, $d$, are at their lower ends pivoted to an annular plate, $d'$, and slide vertically in guides provided therefor at the rear of the upper ends of the lower jaws, $c$, and that said annular ring has pendent links $d^2$, connected by arms $d^3$ to a rock-shaft, $d^4$, substantially as in my said prior Letters Patent No. 167,083; but in said prior machine said rock-shaft was connected by a lever and links to a hand-lever for closing the jaws and holding them firmly locked in that position. I have now provided said rock-shaft $d^4$ with a pendent arm, $d^5$, which is connected by a link, $d^6$, with a cam lever, $d^7$, which has at its free end a roller, which occupies a groove in the cam $D^2$ on the revolving shaft $C$, said cam being formed substantially as shown, and so mounted upon said shaft as to properly close the tongs and maintain them tightly clamped upon a hat-brim for the larger part of each revolution of said shaft. The link $d^6$ is made in two parts and connected by a screw-coupling, whereby said link may be lengthened or shortened, and thus vary the clamping capacity of the tongs, as may be desired.

The banding-ring E, Figs. 11 and 12, Sheet 5, is capable of being swung vertically toward and from the hat block, as is shown in my prior Letters Patent No. 167,083. It also has a rapidly reciprocating vertical movement, as described in my prior Letters Patent No. 200,034, February 5, 1878, and although thus rapidly reciprocated it can also be moved toward and from the hat-block in a manner similar to that shown in my prior Letters Patent No. 244,041; but the organization of the present mechanism pertaining to the working of the banding-ring is wholly novel. In the hat-blocking machines, as shown and described in the Letters Patent issued to George Osterheld and myself April 3, 1866, No. 53,661, and also, as shown in my Letters Patent No. 72,726, December 31, 1867, there was used a banding-ring which was automatically raised and lowered; but in those machines the block used was not expansible, and the blocking operation involved the turning of the hat inside out within a banding-shell instead of the hat remaining, as now, in a properly-distended condition and right side up upon the expansible hat-block during the time the banding-ring performs its service.

Referring now to Sheet 5 it is to be understood that the banding-ring E is mounted between and at the outer ends of a pair of arms, $e^7$, substantially as shown in Letters Patent No. 167,083; but, as therein shown, a hand-lever projected toward the front from the banding-ring, and a balance-weight arm extended rearwardly therefrom, and in Letters Patent No. 244,041 said banding-ring is mounted upon vertically-reciprocating guide-rods, and has a complex hand-lever for lifting and lowering it, and a balance or counter weight. In my present machine the banding-ring has no hand-lever or counter-weight because it is automatically lowered to the hat-block, and also lifted therefrom at the close of each blocking operation. The arms $e$ are mounted upon a pivot-rod or rock-shaft, $e'$, one of said arms being firmly bolted to a bell-crank lever, $e^2$. The lower pendent end of the bell-crank lever $e^2$ is connected by a link, $e^3$, to the upper end of an arm, $e^4$, firmly mounted upon a rock-shaft, $e^5$, to which motion is imparted by the side grooved cam, E', on the revolving shaft C, which acts upon the pendent cam-arm $e^6$, firmly mounted on said rock-shaft, and having at its lower end a roller which occupies the cam-groove. This cam has complex working-faces, whereby the banding-ring is not only moved toward and from the expansible block for placing the ring into and out of its working position, but said ring is also properly reciprocated while in said working position. It will be seen that the main or general outline of the groove in said cam E' is such that during about one-half of its revolution the banding-ring will be maintained in its lowest or working position, and it will also be seen that the wave-line faces $e^7$ (shown in dotted lines in Fig. 9) will cause such a vibration of the cam-arm $e^6$ and the rock-shaft as will cause the banding-ring to vertically reciprocate at high speed while in said working position. This feature of automatically raising and lowering the reciprocating banding-ring is broadly new. In my prior machines the banding-ring has been rapidly reciprocated by means of a crank-shaft and pitmen operating through connecting-links or links and levers, and vertically-sliding rods which supported the banding-ring. The combination of the wave-line cam and the banding-ring is an important novel feature regardless of the particular character of the intermediate connecting mechanism, and whether the banding-ring be moved toward and from the hat-block by hand, as heretofore, or automatically, as now shown.

It is well known that during the blocking and shaping operation, the hats or hat-bodies should be well heated, as by hot water or steam, and that when said operation is completed it is advisable to so far suddenly cool each hat as to fairly set it in its blocked condition before removing it from the hat-block. So far as my knowledge extends I am now the first to devise and apply a douche for delivering water, hot or cold, to hats while undergoing or at the completion of the blocking and shaping operations. In accordance with this portion of my invention the douche may be rendered automatic, as follows: The banding-ring arms may be provided with a perforated ring-shaped pipe, having a pipe-arm extending toward and beyond the rock-shaft $e'$, and by a flexible connection there joined to a hot-water supply-pipe containing cocks, automatically opened and closed by a cam on the rock-shaft C, so that when the ring assumes its working position the hot water will be sprayed upon the hat and be cut off before said ring is elevated and just prior to the close of each blocking operation. It is obvious that the same ring could also be made the conduit for cold water, a service-pipe being also connected therewith and provided with a cock automatically controlled in like manner, or, as would be preferable, that a separate perforated ring of larger dimensions could be employed on an arm of its own for supplying cold water in greater volume. It is also obvious that instead of having separate cocks, the pipe-arm itself at its connection with its supply-pipe could in a well-known manner operate as a cock which would cut-off the flow when said arm was elevated by its cam, and to permit the flow when said arm was depressed. I have, however, illustrated an automatic douche which involves the use of a tilting-pan, as shown on Sheet 6, Fig. 12.

Upon the upper rear portion of the frame of the machine, mounted upon suitable standards, is the water pan or douche F, of which there may be two, mounted side by side, when hot water is also to be applied. This pan is mounted at its rear end upon a rock-shaft, $f$, provided with a slotted arm, $f'$, to which a pendent link, $f^2$, is adjustably pivoted. At its lower end said link $f^2$ is forked so as to straddle the revolving shaft C, and it has a roller which rests upon the working-edge of the cam F', which revolves with said shaft and has a form, substantially as shown, for tipping the pan forward at the proper moment, the weight of said link being sufficient to return the empty pan to its normal position. The pan has at its front end a downwardly-curved spout, $f^3$, through which water is poured when the pan is tilted forward directly upon a hat when on the block B, and at its rear end there is a flush spout from which water flows away when said pan has received its proper quantity. Above the center of the pan is a stationary cock, $f^4$, communicating with a supply-pipe, so that water may be continuously supplied to said pan which can at all times receive the water therefrom regardless of its tilted position.

It is of course obvious that this portion of my mechanism is applicable to blocking and shaping machines, irrespective of the particular character of the mechanism which is in direct contact with the hat and operates thereon, and whether the machine be otherwise wholly or partially automatic or worked by hand, it being equally obvious that the douche, arranged generally as described and as shown, and operated at proper intervals by foot or hand, would be a valuable contrivance as compared with the prior method of applying water in this general connection by hand-dippers, &c.

It is to be understood that my present machine, when at rest, is ready to receive a properly moistened and heated hat, already sufficiently stretched for blocking, whether said stretching has been performed by machinery or by hand; also, that when the hat has been properly placed upon the block the attendant has merely to shift the position of a shipping-lever to start the machine, whereupon the tongs seize and expand the brim, the block begins to expand and rise and the banding-ring to take its working position and to reciprocate therein, and that when the hat has been blocked and douched the machine stops automatically, leaving the tongs open, the block contracted and lowered, and the banding-ring so elevated as to enable the blocked hat to be removed and another to be placed upon the block.

As hereinbefore indicated, hat-blocking machines as heretofore organized have invariably involved hand-levers or foot-treadles for effecting the necessary movements and the preparatory adjustment of parts, except the mere lifting and lowering of the block and the reciprocation of the expanding-ring, and also excepting certain automatic operations, as shown and described in Letters Patent No. 53,661, wherein there is a revolving tip-flattener and weighted banding-rings, which are lifted and lowered. None of these prior machines wherein power has been applied, as stated, had any automatic stop-motion, although I have myself applied such motions to automatic hat-stretching machines, as illustrated in prior Letters Patent Nos. 256,203 and 256,305, issued to me April 11, 1882. It is obvious that various well-known forms of clutching and shipping mechanism may be employed, and that the stop-motion may be variously organized therewith and operated by any suitable moving portion of the machine at the close of the blocking operation.

On Sheet 7 I show, in Fig. 18, the cam-shaft C, having thereon the side-grooved cam B', which expands the block B, the edge-faced cam B², which lifts and lowers the block, the two side-grooved cams D', which spread the tongs D, the side-grooved cam D², which operates to close the jaws of the tongs for clamping the brim, the cam E', which lifts and lowers and reciprocates the banding-ring, and the cam F', which operates the douche-pan.

It is obvious that this cam-shaft C should revolve quite slowly, and that it should be promptly started and stopped by the shipping mechanism, and I therefore have constructed said shaft in two sections, C and C', the latter having the belt-pulley $g$ loosely mounted thereon, and the friction-clutch $g'$ splined thereto, and said two sections are rotatively connected by means of the crank and differential gearing at C², substantially as organized heretofore by me and shown in my prior Letters Patent No. 256,305, April 11, 1882, the said gearing being obviously arranged so that with a rapid rotation of the shaft-section C' the cam-shaft proper, C, will be slowly and steadily rotated.

Other forms of gearing may be employed; but that shown is compact, effectual, and more economical than an ordinary chain of gearing suitable for obtaining the same reduction in speed.

The friction-clutch $g'$ is of the conical type, and engages with a correspondingly inclined annular surface within the belt-pulley $g$, as in my prior automatic hat-stretching machines, before referred to, and, as before in those machines, I now control said clutch by means of a vertical yoke-lever, $g^2$, fixedly pivoted at its lower end, and a horizontal shipper-lever, $g^3$, provided with a handle, and movable at its front end laterally within a horizontal guide-plate, $g^4$, slotted to receive it.

Beneath the shipper-lever $g^3$, near its guide-plate, is a spring-latch, $g^5$, which engages with said lever for maintaining the clutch in its operative position, and said latch is made to release the shipper by a pendent slotted link, $g^6$, and an arm, $g^7$, which engages therewith by a pin in its slot, and is firmly mounted upon a projecting end of the square rock-shaft $d^4$, which operates the upper or clamping jaws of the tongs, as seen in Fig. 7, the parts being so arranged and timed that when the clamping-jaws have been nearly elevated, the stop-motion is operated for stopping the machine. It is obvious that this or equivalent stopping mechanism may be profitably employed in any hat-blocking machine, wherein steam or similar power is applied, and whether it be wholly or partially automatic, and as I am the first to devise and organize in such machines a stop-motion, and to develop the practical value thereof, I claim as a feature of my present invention, the combination of a stop-motion with one or more automatic organizations co-operating to block hats, whereby the machine will be stopped at the completion of the blocking operation regardless of the particular character of the hat-block and the devices co-operating therewith, and whether all or only a portion of the several operations or movements herein described are automatic.

Although the mode of working my machine will be readily comprehended by persons skilled in hat-blocking, I will now briefly describe the same.

The machine having been properly adjusted for blocking hats of some particular size and height of crown, is, when at rest, in proper condition to receive a hat, which, having been properly heated and moistened, is placed upon the block with its crown resting thereon. The handle of the shipper-lever $g^2$ is then moved by hand toward the machine, and placed in the custody of the spring-latch $g^5$ for starting the machine, the loose belt-pulleys being of course meantime revolving. The tongs move inward simultaneously, so that the brim of the hat rests upon their lower jaws. The upper jaws meantime descend, and after the tongs have firmly engaged with the brim they commence to expand. Meantime the banding-ring will have descended to its working position and be rapidly reciprocated, and the block will be properly raised and expanded. After the cam-shaft C has made one complete revolution the blocking will have been completed, the cold water applied to the hat, and the several portions of the machine returned to their normal positions, whereupon the machine will stop in position for the ready removal of the blocked hat, and the reception of another.

Having thus described my invention, I claim as new and desire to secure by Letters Patent—

1. In a hat-blocking machine, the combination, substantially as hereinbefore described, of an expansible hat-block and its automatic expanding mechanism.

2. The combination, substantially as hereinbefore described, of an expansible hat-block, its automatic expanding mechanism, and adjusting mechanism, whereby the degree of expansion of the hat-block may be varied.

3. The combination, substantially as hereinbefore described, of an expansible hat-block and its automatic mechanism for raising and lowering it independently of its expanding mechanism.

4. The combination, substantially as hereinbefore described, of an expansible hat-block, its automatic raising and lowering mechanism, and its adjusting mechanism for varying the height of lift for operating on various heights of hat-crown.

5. The combination, substantially as hereinbefore described, of a hat-block, a series of expansible brim-clamping tongs, and their automatic expanding and contracting mechanism.

6. The combination, substantially as hereinbefore described, of a hat-block, a series of expansible brim-clamping tongs, their automatic expanding mechanism, and the adjusting mechanism whereby the extent of expansion by said tongs is varied.

7. The combination, substantially as hereinbefore described, of a hat-block, a banding-ring, a series of brim-clamping tongs, and automatic mechanism for closing the jaws upon a brim and maintaining them in a closed condition, and opening them for releasing the brim.

8. The combination, substantially as hereinbefore described, of an expansible hat-block, a banding-ring, and automatic mechanism for moving the banding-ring toward and from the hat-block.

9. The combination, substantially as hereinbefore described, of a hat-block, a rapidly-reciprocating banding-ring, and automatic mechanism for vertically reciprocating the banding-ring during the blocking of a hat, and moving said ring into and out of its working position.

10. The combination of the banding-ring, the wave-line cam, and the intermediate connecting mechanism, substantially as described, for lifting and lowering said ring, and causing it to be rapidly reciprocated.

11. In a hat-blocking machine, the combination, with the hat-block, of a swinging or tilting douche, and mechanism for placing said douche into position for the delivery of water therefrom upon a hat when mounted on said block, substantially as described, and for the purposes specified.

12. In a hat-blocking machine, an automatically-operated douche, substantially as described, whereby at proper intervals water is delivered upon a hat, as and for the purposes specified.

13. In a machine for blocking and shaping hats, the combination, substantially as hereinbefore described, of the following co-operative organizations: first, the expansible block, and the automatic mechanism for lifting, lowering, expanding, and contracting said block; second, the annular series of brim-clamping tongs, and the automatic mechanism for closing and opening the jaws of said tongs, and for expanding and contracting them; third, the banding-ring, and the automatic mechanism for lowering, raising, and rapidly reciprocating said ring.

14. In a hat-blocking machine, operated automatically in whole or in part, the combination, substantially as hereinbefore described, of its automatically-operated mechanism and a stop-motion whereby the machine is stopped at the end of each complete automatic operation.

RUDOLF EICKEMEYER.

Witnesses:
WM. H. DOPP,
GEORGE NARR.